(12) United States Patent
Kurien et al.

(10) Patent No.: US 9,135,357 B2
(45) Date of Patent: *Sep. 15, 2015

(54) USING SCENARIO-RELATED INFORMATION TO CUSTOMIZE USER EXPERIENCES

(75) Inventors: Thekkthalackal Varugis Kurien, Sammamish, WA (US); Steven E. Jackson, Issaquah, WA (US); Scott A. Field, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,335

(22) Filed: Sep. 20, 2010

(65) Prior Publication Data

US 2011/0010354 A1   Jan. 13, 2011

Related U.S. Application Data

(63) Continuation of application No. 11/688,002, filed on Mar. 19, 2007, now Pat. No. 7,818,341.

(51) Int. Cl.
```
G06F 7/76      (2006.01)
G06F 17/30     (2006.01)
G06F 7/06      (2006.01)
```
(52) U.S. Cl.
CPC ...... *G06F 17/3089* (2013.01); *G06F 17/30643* (2013.01); *G06F 17/30867* (2013.01)

(58) Field of Classification Search
CPC   G06F 7/10; G06F 17/30643; G06F 17/30867
USPC .......................................... 707/827, 999.005
See application file for complete search history.

(56) References Cited

U.S. PATENT DOCUMENTS

| 7,437,338 B1 | 10/2008 | Forman et al. |
| 7,797,311 B2 | 9/2010 | Kurien et al. |
| 7,818,341 B2 | 10/2010 | Kurien et al. |

(Continued)

OTHER PUBLICATIONS

"XML Schema Part 1: Structures Second Edition", Oct. 28, 2004, W3C.*

(Continued)

*Primary Examiner* — Christyann Pulliam
*Assistant Examiner* — Sheryl Holland
(74) *Attorney, Agent, or Firm* — Nicholas Chen; Kate Drakos; Micky Minhas (57) ABSTRACT

Methods for using scenario solution-related information to generate customized user experiences are provided. Upon receiving a user query, a plurality of results is returned, each result being representative of a scenario solution which may be utilized to address a particular issue relevant to the received query. At the time of authoring, each scenario solution is organized based upon one or more keywords and/or one or more categories (i.e., namespaces). Data associated with a namespace/keyword corresponding to a returned search result may be mined to determine information beyond basic scenario solution search results that may be of interest to the user. As the namespace(s)/keyword(s) in association with which to organize a particular executable scenario solution is determined by the author of the scenario solution, other information associated with the same namespace/keyword (and/or a namespace/keyword having a relationship thereto) is likely to be more relevant than information organized based upon keywords alone.

20 Claims, 3 Drawing Sheets

(56) References Cited

U.S. PATENT DOCUMENTS

| | | |
|---|---|---|
| 2002/0052894 A1* | 5/2002 | Bourdoncle et al. .......... 707/513 |
| 2002/0072040 A1 | 6/2002 | Bajer et al. |
| 2003/0011629 A1 | 1/2003 | Rouse |
| 2003/0076347 A1 | 4/2003 | Barrett |
| 2003/0225777 A1 | 12/2003 | Marsh |
| 2004/0006550 A1* | 1/2004 | Upton ............................... 707/1 |
| 2004/0186830 A1* | 9/2004 | Delic et al. ........................ 707/3 |
| 2005/0060350 A1 | 3/2005 | Baum |
| 2006/0112055 A1* | 5/2006 | Tapio et al. ..................... 706/46 |
| 2006/0129536 A1* | 6/2006 | Foulger et al. .................... 707/3 |
| 2006/0190439 A1* | 8/2006 | Chowdhury et al. ............. 707/3 |
| 2006/0200371 A1* | 9/2006 | Spector et al. ................... 705/7 |
| 2006/0200455 A1* | 9/2006 | Wilson .............................. 707/4 |
| 2006/0265201 A1* | 11/2006 | Martin .............................. 703/6 |
| 2006/0265508 A1* | 11/2006 | Angel et al. ................. 709/230 |
| 2007/0118802 A1* | 5/2007 | Gerace et al. ................. 715/738 |
| 2007/0157227 A1 | 7/2007 | Carpenter et al. |
| 2008/0010132 A1 | 1/2008 | Aaron |

OTHER PUBLICATIONS

"UDDI Technical White Paper," Internet Citation, Sep. 6, 2000, XP002230398, Retrieved Feb. 7, 2003 from URL:http://www.uddi.org/pubs/lru_UDDI_Technical_White_Paper.pdf (U.S. Appl. No. 11/688,037).

Office Action dated Jan. 4, 2011 in U.S. Appl. No. 11/688,023.

Supplementary EP Search Report, Dated Feb. 2, 2011 in U.S. Appl. No. 11/688,037, 4 pp.

EP Search Report, dated Feb. 15, 2011, re PCT/US2008052479, 5 pages.

Non-final Office Action, U.S. Appl. No. 11/688,037, mailed May 18, 2011, 13 pp.

Notice of Allowance, mailed Sep. 27, 2011, U.S. Appl. No. 11/688,037, 20 pp.

* cited by examiner

USING SCENARIO-RELATED INFORMATION TO CUSTOMIZE USER EXPERIENCES

CROSS-REFERENCE TO RELATED APPLICATIONS

This application is a continuation of U.S. patent application Ser. No. 11/688,002, filed Mar. 19, 2007, the entirety of which is incorporated by reference herein.

BACKGROUND

Use of online searching as a means to locate desired information has significantly increased in recent years to become one of the most prevalent systems for locating information in use today. Generally, search engines utilize keyword matching to locate information containing identical and/or similar keywords to a search query input by a user. While keyword matching has its advantages over more generic search methods, a significant number of items are often returned in response to a search query, many of which are not related to the core topic intended by the user.

Advancements in keyword search have more recently been directed toward mining search-related data in an attempt to enhance a user's search experience. For instance, suppose a user initiates a search containing the keywords "photographs and editing." In response thereto, a plurality of items is returned to the user, each containing and/or relating to the input keyword. A more advanced search engine may also return information based on search-related data mining such as, "Users who searched 'photographs and editing' also searched the keyword 'cropping'", or "The most popular selections by users who searched the keywords 'photographs and editing' are . . . ", and the like. While such suggestions provide the user with an enhanced user experience relative to a search engine that returns basic keyword results and nothing further, the user experience may still suffer from a lack of relevance.

For example, suppose the user initiating the above search isn't interested in consumer photograph editing but rather in photograph editing using commercial photography equipment. Being presented with a list of keywords or sites utilized by others who also searched the keywords "photographs and editing" will likely more often return selections relevant to consumer photograph editing as it is more likely that a greater number of users are interested in editing photographs on their personal computer than in editing using commercial photography equipment. Accordingly, the data mining information returned in this instance is still not related to the core topic of interest to the user.

SUMMARY

Embodiments of the present invention relate to systems, methods, and computer-readable media for using scenario-related information to generate customized user experiences. Upon receiving a user query, it is assumed that the user desires to solve a particular problem or, more precisely, desires to execute a scenario-specific solution and/or achieve a particular result. Thus, when a query is received, executable scenario solutions that are relevant to the query are determined. At the time of authoring, each executable scenario is organized based upon one or more keywords and/or categories (i.e., namespaces). Thus, once a scenario and its corresponding namespace(s)/keyword(s) are determined, data, e.g., metadata, associated with the namespace(s)/keyword(s) may be mined to determine information beyond basic scenario search results that may be of interest to the user. As the namespace(s)/keywords utilized to organize a particular executable scenario is determined by the author of the scenario and may be further qualified by rating (e.g., community rating or certification), other information associated with the same namespace/keyword is likely to be more relevant than information organized based upon keywords alone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for using scenario-related information to generate customized user experiences. When receiving a user query, it is assumed that the user desires to solve a particular problem or, more precisely, desires to execute a scenario-specific solution and/or achieve a particular result. Accordingly, each item returned in response to the user query is representative of a particular solution, or "scenario solution" as it is referred to herein. At the time of authoring, each executable scenario solution is organized based upon one or more keywords and/or categories (i.e., namespaces). Thus, data, e.g., metadata, associated with a namespace/keyword corresponding to a returned search result may be mined to determine information beyond basic scenario search results that may be of interest to the user. As the namespace(s)/keyword(s) utilized to organize a particular executable scenario solution is determined by the author of the scenario solution and may be further qualified by rating (e.g., community rating or certification), other information associated with the same namespace/keyword (and/or a namespace/keyword having a relationship thereto) is likely to be more relevant than information organized based upon keywords alone. This mined information may then be utilized to create a customized, relevant user experience.

Accordingly, in one aspect, the present invention provides one or more computer-readable media having computer-executable instructions embodied thereon that, when executed, perform a method for using scenario-related information to generate a customized user experience. The method includes receiving a scenario-related query, determining at least one executable scenario solution that is relevant to the scenario-related query, determining at least one namespace and/or keyword associated with the at least one executable scenario, and utilizing at least one of metadata and a user-executable scenario solution instance associated with the at least one namespace and/or keyword to generate a user experience.

In another aspect, the present invention provides a method for using scenario-related metadata to generate a user experience. The method includes storing scenario-related information in association with a namespace and/or a keyword, the scenario-related information including one or more of at least one user-executable scenario solution instance and metadata that corresponds to one or more users and/or one or more enablers; receiving a scenario-related query; and utilizing the scenario-related information to generate a user experience relevant to the received scenario-related query. In embodiments, the method may further include identifying at least one user-executable scenario solution instance that is relevant to the scenario-related query, receiving user selection of the identified at least one user-executable scenario solution instance, and storing metadata that corresponds to the user selection in association with the namespace/keyword.

In a further aspect, the present invention provides a computerized system for utilizing scenario-related information to generate a customized user experience. The computerized system includes an end-user device configured for receiving a scenario-related query, and a server configured for receiving the scenario-related query from the end-user device and generating a customized user experience related thereto. The end-user device and the server are in communication with one another via a network. In embodiments, the server includes a receiving module configured for receiving the scenario-related query from the end-user device, a data mining module configured for mining scenario-related information associated with at least one namespace/keyword to determine one or more of at least one user-executable scenario solution instance and metadata that corresponds to a user-executable scenario solution, and a transmitting module configured for transmitting at least one suggestion based upon the scenario-related information determined to be relevant to the scenario-related query for presentation in association with the end-user device.

Having briefly described an overview of embodiments of the present invention, an exemplary operating environment suitable for use in implementing embodiments of the present invention is described below.

Figure 1:
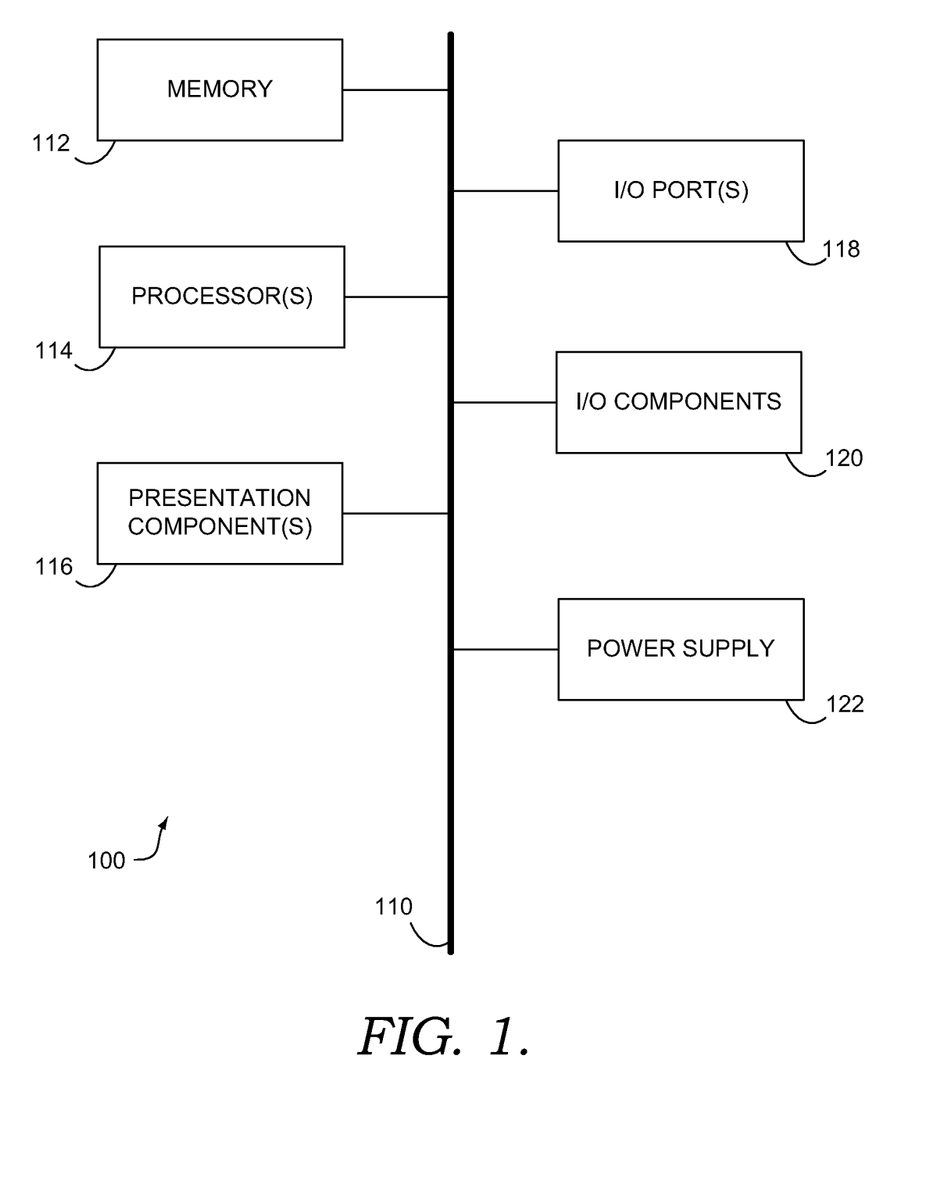
FIG. 1 is a block diagram of an exemplary computing environment suitable for use in implementing the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
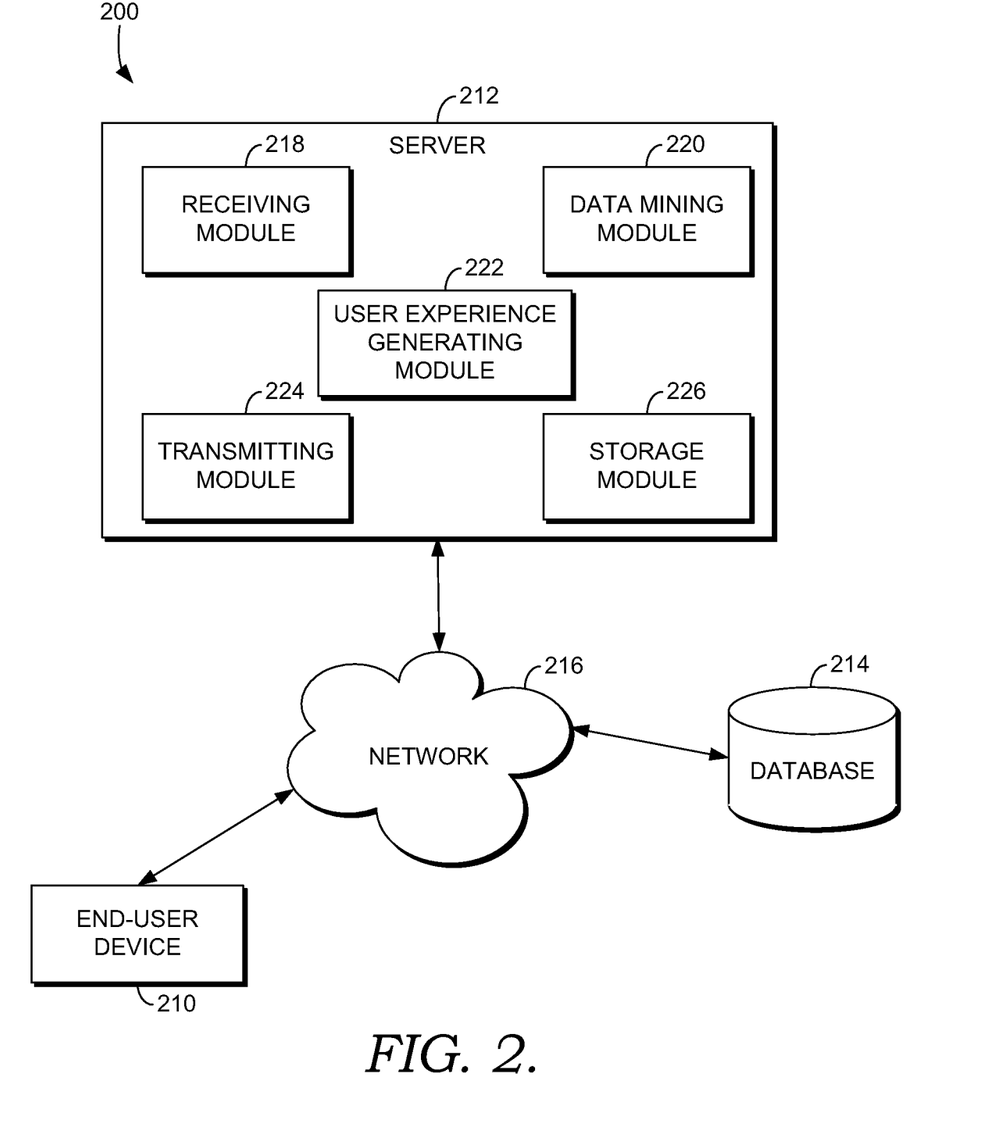
FIG. 2 is a block diagram of an exemplary computer system architecture suitable for use implementing embodiments of the present invention.

As previously mentioned, in one embodiment, the present invention relates to a method for receiving a scenario-related search query, identifying executable scenario solutions relevant to the received query (each executable scenario solution being comprised of a scenario description and a solution, as more fully described below), determining at least one namespace/keyword with which the executable scenario solution is associated, and using scenario-related information associated with the determined namespace/keyword to generate a customized, relevant user experience Turning now to FIG. 2, a block diagram is illustrated that shows an exemplary system architecture 200 configured for generating a customized user experience utilizing scenario-related information, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes an end-user device 210, a server 212, and a database 214, all in communication with one another via a network 216. The network 216 may include, without limitation, one or more local area networks (LANs) and/or one or more wide area networks (WANs). Such networking environments are commonplace in offices, enterprise-wide computer networks, intranets, and the Internet. Accordingly, the network 216 is not further described herein.

The database 214 is configured to store information associated with at least one executable scenario solution. In various embodiments, such information may include, without limitation, metadata associated with one or more scenario-related queries, metadata associated with one or more scenario solutions, metadata associated with one or more scenario descriptions, metadata associated with one or more scenario queries, one or more user-executable scenario instances, and the like. In embodiments, the database 214 is configured to be searchable for one or more of the items stored in association therewith. It will be understood and appreciated by the those of ordinary skill in the art that the information stored in the database 214 may be configurable and may include any information relevant to an executable scenario. The content and volume of such information are not intended to limit the scope of embodiments of the present invention in any way. Further, though illustrated as a single, independent component, database 214 may, in fact, be a plurality of databases, for instance, a database cluster, portions of which may reside on the end-user device 210, the server 212, another external computing device (not shown), and/or any combination thereof.

Each of the end-user device 210 and the server 212 may be any type of computing device, such as, for example, computing device 100 described above with reference to FIG. 1. By way of example only and not limitation, each of the end-user device 210 and the server 214 may be a personal computer, desktop computer, laptop computer, handheld device, mobile handset, consumer electronic device, or the like. It should be noted, however, that the present invention is not limited to implementation on such computing devices, but rather may be implemented on any of a variety of different types of computing devices within the scope of embodiments hereof.

As shown in FIG. 2, the server 212 includes a receiving module 218, a data mining module 220, a user experience generating module 222, a transmitting module 224, and a storage module 226. In some embodiments, one or more of the modules 218, 220, 222, 224 and 226 maybe be implemented as stand-alone applications. In other embodiments, one or more of the modules 218, 220, 222, 224 and 226 may be integrated directly into the operating system of the server 212 or the end-user device 210. It will be understood by those of ordinary skill in the art that the modules 218, 220, 222, 224 and 226 illustrated in FIG. 2 are exemplary in nature and in number and should not be construed as limiting. In any number of modules may be employed to achieve the desired functionality within the scope of embodiments of the present invention.

The receiving module 218 is configured for receiving a scenario-related query, e.g., from the end-user device 210. A scenario-related query may be input by a user much like a standard keyword search query may be input, for instance, in association with an appropriate field presented on a user interface, or the like. However, in accordance with embodiments of the present invention, when a user query is input, it is assumed that a user desires to solve a particular problem, that is, that the user desires to execute a solution to the problem and/or achieve a particular result. Accordingly, each item returned in response to the user query is representative of a particular series of steps implemented by a workflow or a "scenario solution" as it is referred to herein.

A scenario solution is typically authored by an individual that is an expert in his or her field, an individual that has a particular interest in a field associated with the scenario solution, and/or an individual that has been confronted with the issue that the scenario solution purports to address. Scenario solutions are comprised of two scenario entities: a solution and a scenario description. A "solution," as the term is utilized herein, is essentially a series of steps implemented by a workflow. Often times, scenario solutions are comprised of sub-scenario solutions whose sequential execution (e.g., organized via a requires relation) results in successful completion of the scenario solution end-to-end. Thus, a scenario solution may include any number of scenario sub-solutions associated with one another such that they may be executed in a particular order.

It should be noted that scenario solutions may either be authored from scratch or existing scenario solutions may be located and reused (whether modified or unmodified). Further, authoring a scenario solution may be as simple as recording and replaying a search session or it may be more complex, for instance, by executing search queries in the context of a C++ or Javascript program. Any and all such variations are contemplated to be within the scope of embodiments hereof.

Often, successful completion of a scenario solution requires one or more peripheral objects or enablers. An "enabler," as the term is utilized herein, may include, for instance, a document, a software/hardware object, and/or a person or organization that freely (or for financial gain) implements a scenario solution. It will be understood and appreciated by those of ordinary skill in the art that the listed enablers are provided by way of example only and that embodiments of the present invention are not so limited. Any object that implements a scenario solution or sub-scenario solution may be considered an enabler within embodiments hereof.

In addition to one or more solutions, scenario solutions include a scenario description. A "scenario description," as the term is utilized herein, is a webpage that describes an executable scenario solution. Scenario descriptions may be generated by any number of methods including, without limitation, receipt of a description from the scenario solution author, extraction of one or more keywords from the corresponding solution, or the like. It will be understood and appreciated by those of ordinary skill in the art that embodiments of the present invention are not intended to be limited to any particular system or method for generating scenario descriptions. Any number of known description-generating methods may be utilized in accordance with embodiments hereof. Scenario descriptions are typically located by keyword search (the keywords being derived from a scenario-related query) and selectable identifiers thereof are presented in response to a search request, as more fully described below.

Once a scenario solution author completes the authoring of an executable scenario solution, the scenario may be published into one or more namespaces and/or associated with one or more keywords such that it may be searched upon receipt of a scenario-related query, as more fully described below. "Namespaces," as utilized herein, are used to segment knowledge into verticals and to provide an extensibility point for customized and scenario solution-specific search terms. For instance, the "My Media/My Music" namespace may contain scenario solutions that are music scenario solution whereas the "My Life/My Store" namespace may contain information about stores at which a user commonly shops. A namespace provides a meta-data specification relevant to a scenario solution by providing keywords specific to the namespace (similar to search macros). The root namespace defines basic keywords and relations used by the search engine. Namespaces provide a vocabulary for restricting search by defining a schema. For example, the word "format" means something different in the "My Media" namespace than it does in the "Storage" namespace. That is, a namespace defines keywords that can be used in search queries when targeted against that namespace.

When an author publishes a scenario solution, s/he specifies a tag (e.g., a meta-tag) that describes the namespace(s)/keyword(s) in association with which s/he wants to publish the scenario solution. The author is incentivized to apply the appropriate namespace/keyword tag(s) to a published solution so that the search engine may locate it more easily. Systems and methods for publishing information in a network environment so that it may be accessible by other users are known in the art and, accordingly, are not further described herein. Embodiments of the present invention are not limited to any particular publication system/method.

Returning now to FIG. 2, the receiving module 218 is further configured for receiving metadata that corresponds to a user associated with the end-user device 210. For instance, a user may have one or more enablers stored in association with the end-user device 210 or an execution workspace such that upon execution of a scenario solution requiring such enabler(s), acquisition of the enabler(s) will not be necessary. Additionally, a user may be a member of a particular user group, for instance, a group of individuals who regularly correspond about a mutual topic of interest. Still further, a user may have personal and/or demographic information published in association with his/her login or identity. Any and all such information to which access has been provided to the search engine, may be received by the receiving module 218 and utilized to generate a customized, relevant user experience, as more fully described below.

The data mining module 220 is configured for mining scenario-related information associated with at least one namespace and/or at least one keyword to identify user-executable scenario solution instances and/or metadata that corresponds to one or more users and/or enablers that is relevant to a received scenario-related query. For instance, if a user inputs a search query for which it is determined that the most relevant corresponding scenario solution are published in association with a namespace entitled "Consumer Photograph Editing" and/or they keyword phrase "Photo Editing", data related to other scenarios published in association with the same namespace and/or keywords may be mined utilizing data mining module 220. Such information may include, without limitation, other scenario solutions in which users selecting a particular scenario solution were also interested, data regarding enablers that may be necessary or useful in executing a particular scenario solution, or the like. Identification of such information, though not directly correlated to the scenario solution determined to most closely address the user's query, may be utilized to generate a relevant, customized user experience, as more fully described below, as such information has been categorized similarly to that which is directly correlated to the search query.

In embodiments, the data mining module 220 is further configured for mining metadata that corresponds to at least one user group to determine if the user is a member of the user group and, if so, to identify metadata associated with at least one additional member of the user group. For instance, if a user is a member of a particular user group that shares a mutual interest in consumer photograph editing, scenario solutions recently executed and/or websites recently visited by other members of the user group may be of interest to the user. Such information may be mined, utilizing data mining module 220, and utilized to generate a customized, relevant user experience, as more fully described below.

Additionally, the data mining module 220 is further configured for mining metadata relative to associations between namespaces/keywords and/or scenario solution. That is, the data mining module 220 is configured to identify namespaces/keywords and/or scenario solutions that occur together with relatively increased frequency. Such information may then be utilized, as more fully described below, to generate suggestions and customize a user experience.

It will be understood and appreciated by those of ordinary skill in the art that data mining techniques, for instance, simple aggregation, rollups, associative rule mining and the like, are known to those of ordinary skill in the art and that embodiments of the present invention are not intended to be limited to any particular data mining technique.

The user experience generating module 222 is configured for utilizing scenario solution-related information to generate a customized user experience. That is, the user experience generating module 222 is configured to take the scenario-related query and any scenario solutions identified and/or information mined in association therewith, and to generate a user experience that is relevant to the user's topic of interest as well as customized for the user. In this regard, the user experience generating module 222 is configured to identify at least one scenario solution that corresponds to the user's query and at least one suggestion based upon the mined data, the at least one suggestion being relevant to the user's query but not necessarily directly addressing the query.

The transmitting module 224 is configured for transmitting the identified scenario solution and the at least one identified suggestion for presentation in association with the end-user device 210. In embodiments, the transmitting module 224 is further configured for transmitting at least one suggestion based upon the metadata associated with at least one additional member of a user group for presentation in association with the end-user device 210, if it is determined that the user is a member of at least one user group.

The storage module 226 is configured for storing scenario solution-related information relevant to the scenario-related query in association with the at least one namespace/keyword. For instance, the storage module 226 is configured for storing the suggestion(s) transmitted to the user for presentation and the user's response thereto in association with the namespace/keyword in association with which the scenario solution(s) best addressing the search query is published. This information may then be mined in response to future user queries so that irrelevant or uninteresting information is weeded out and those suggestions which users indicate are most helpful (by their responses thereto or selection thereof), are more often suggested. In this way, the search engine is continually updated to ensure that the information being suggested to users remains relevant.

Figure 3:
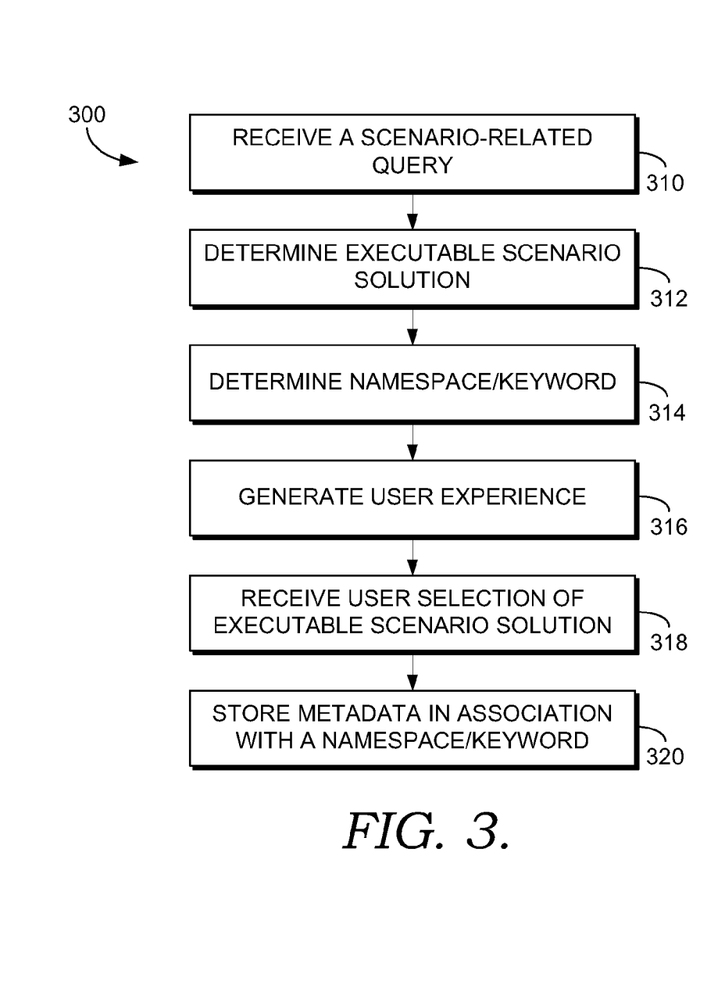
FIG. 3 is a flow diagram showing a method for using scenario-related information to generate a customized user experience, in accordance with an embodiment of the present invention.

Turning now to FIG. 3, a flow diagram is shown illustrating a method 300, for using scenario solution-related information to generate a customized user experience, in accordance with an embodiment of the present invention. Initially, as indicated at block 310, a scenario-related query is received, e.g., utilizing the receiving module 218 of FIG. 2. Subsequently, as indicated a block 312, at least one executable scenario solution that is relevant to the scenario-related query is determined. Next, as indicated at block 314, at least one namespace/keyword associated with the executable scenario solution is determined, for instance, utilizing data mining module 220 of FIG. 2. Subsequently, at least one of metadata and a user-executable scenario solution instance associated with the determined namespace/keyword is utilized to generate a customized user experience (e.g., utilizing user experience generating module 222 of FIG. 2). This is indicated at block 316.

Subsequently, the user experience may be transmitted, for instance, utilizing network 216, to a display device associated with, for instance, end-user device 210 of FIG. 2. A user at end-user device 210, may subsequently select one of the executable scenario solutions presented as part of the user experience and such selection may be received, for instance, utilizing receiving module 218 of FIG. 2. This is indicated block 318. Subsequently, metadata that corresponds to the user selection of the executable scenario solution is stored in association with the namespace/keyword, as indicated at block 320.

Figure 4:
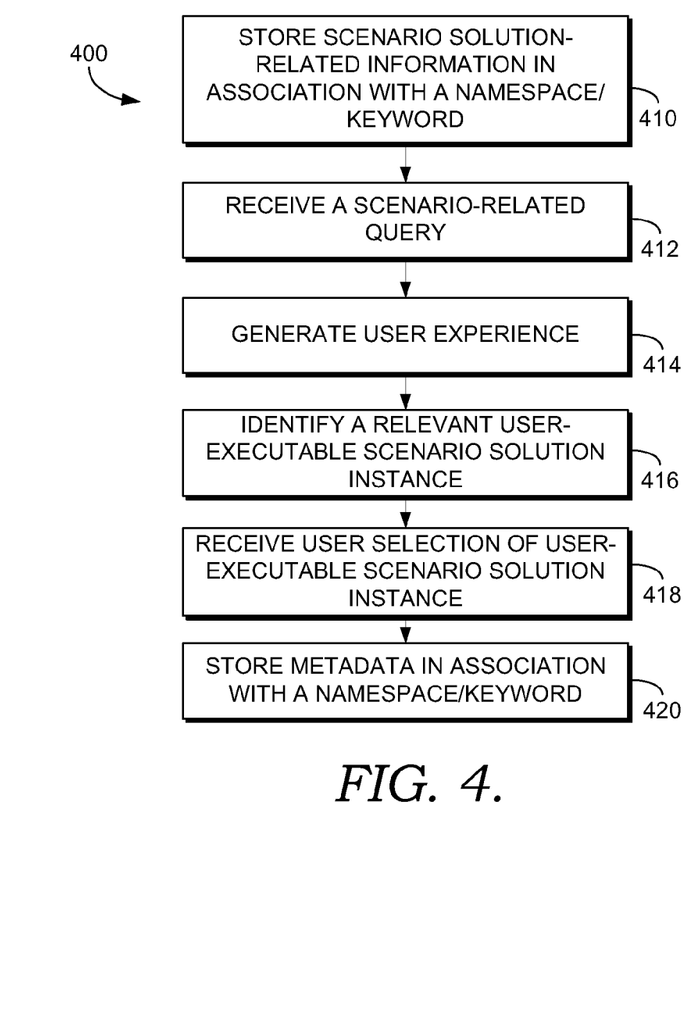
FIG. 4 is a flow diagram showing a method for using scenario-related information to generate a user experience relevant to a particular scenario, in accordance with an embodiment of the present invention.

Turning now to FIG. 4, a flow diagram is shown illustrating a method 400 for using scenario solution-related metadata to generate a user experience, in accordance with an embodiment of the present invention. Initially as indicated at block 410, scenario solution-related information is stored in associated with a namespace/keyword. Scenario solution-related information may include, by way of example only, a solution and corresponding scenario description, raw statistics related to user selection of the scenario solution, related scenario solution, related enablers, and the like. Subsequently, a scenario-related query is received, for instance, from a user at end-user device 210 of FIG. 2. This is indicated at block 412. Next, as indicated at block 414, the scenario solution-related information stored in associated with the namespace/keyword is utilized to generate a user experience relevant to the received scenario-related query. In one embodiment utilizing this scenario solution-related information to generate a user experience relevant to the received scenario-related query may include transmitting a scenario solution determined to address the user's query and at least one suggestion based upon the scenario-related query for presentation. In other embodiments, utilizing this scenario-related information to generate a user experience may include identifying at least one user-executable scenario instance that is relevant to the scenario-related query, determining at least one enabler required for completing a scenario solution associated with the user-executable scenario solution instance, mining the scenario-related information to determine if at least one other user-executable scenario instance associated with the namespace/keyword is also associated with the at least one enabler, and, if it is determined that at least one other user-executable scenario solution instance associated with the namespace/keyword is also associated with at least one enabler, transmitting at least one suggestion based upon the at least one user-executable scenario solution for presentation.

Returning now to FIG. 4, the method further includes, identifying at least one user-executable scenario solution instance that is relevant to the scenario-related query, as indicated at block 416. Once identified such user-executable scenario solution instance maybe transmitted, for instance, to a user at end-user device 210 of FIG. 2, and such user may indicate selection of the user-executable scenario solution instance. This user selection may be received, for instance, utilizing receiving module 218 of FIG. 2. This is indicated at block 418. Subsequently, as indicated at block 420, metadata that corresponds to the user selection may be stored in association with the namespace/keyword for use in association with future user queries.

As can be understood, embodiments of the present invention provide systems, methods, and computer-readable media for using scenario solution-related information to generate customized user experiences. When receiving a user query, each item returned in response to is representative of a particular series of steps implemented by a workflow or a "scenario solution". At the time of authoring, each executable scenario solution is organized based upon one or more keywords and/or one or more categories, that is, is published in association with at least one namespace/keyword. Thus, data, e.g., metadata, associated with a namespace/keyword corresponding to a returned search result may be mined to determine information beyond basic scenario solution search results that may be of interest to the user. As the namespace(s)/keyword(s) in which to organize a particular executable scenario solution is determined by the author of the scenario solution, other information associated with the same namespace/keyword (and/or a namespace/keyword having a relationship thereto) is likely to be more relevant than information organized based upon keywords alone. This mined information may then be utilized to create a customized, relevant user experience.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method for using authored scenario solutions to generate a user-specific experience for a user using an end-user device to employ a search engine, the method comprising:

obtaining one or more user-executable scenario solution instances from an author for a specific problem, wherein each of the one or more user-executable scenario solution instances comprises a programmed series of steps implemented by a workflow that corresponds to the specific problem;

tagging by the author, the one or more user-executable scenario solution instances in association with at least one namespace or keyword;
storing the one or more user-executable scenario solution instances, the at least one namespace or keyword, at least one scenario description, one or more related user-executable scenario solution instances, and one or more enablers used to implement the one or more user-executable scenario solution instances;
receiving at the search engine a scenario-related query from a user, the scenario-related query being related to a user-specific problem and the user being different from the author;
receiving metadata that corresponds to at least one of the user or the end-user device;
based on the scenario-related query from the user received at the search engine, mining solution related information associated with the at least one namespace or keyword to identify
  A) at least one user-executable scenario solution instance for the user-specific problem,
  B) at least one related user-executable scenario solution instance that is related to, but not the same as, the at least one user-executable scenario solution instance for the user-specific problem, and
  C) at least one enabler that is determined to be useful for completing at least a portion of the series of steps corresponding to the user-specific problem; and
transmitting at least one suggestion based upon an indication of the at least one user-executable scenario solution instance, the at least one related user-executable scenario solution instance, and the at least one enabler for presentation to the user.

2. The method of claim 1 further comprising:
receiving user information;
comparing the user information to metadata stored in association with the at least one namespace or keyword to determine if at least one additional user is associated with the at least one namespace or keyword;
determining that at least one additional user is associated with the at least one names pace and keyword; and
transmitting at least one suggestion based upon metadata associated with the at least one additional user for presentation.

3. The method of claim 1 further comprising:
receiving user information;
determining if the user is a member of a user group; and
determining if metadata that corresponds to at least one additional user that is also a member of the user group is stored in association with the at least one names pace and keyword.

4. The method of claim 3, wherein if it is determined that metadata associated with the at least one additional user is stored in association with the at least one namespace and keyword, transmitting at least one suggestion based upon the at least one additional-user metadata for presentation.

5. The method of claim 1 further comprising:
storing metadata that corresponds to the scenario-related query in association with the at least one namespace or keyword.

6. The method of claim 1, wherein the at least one user-executable scenario solution instance comprises more than one scenario sub-solutions associated with one another.

7. The method of claim 6, wherein the scenario sub-solutions are executed in a particular order.

8. The method of claim 1 further comprising:
receiving user selection of one of the at least one user-executable scenario solution instance that is relevant to the scenario-related query; and
storing metadata that corresponds to the user selection in association with the namespace and keyword.

9. A computerized system including one or more processors for utilizing scenario solution-related information to generate a customized user experience for a user employing a search engine, the system comprising:
a receiving module associated with a search engine that receives a scenario-related search query from a user at an end-user device and further configured to receive metadata that corresponds to the user or the end-user device;
a data mining module associated with the search engine configured to mine scenario-related information associated with at least one namespace or keyword;
a user experience generating module associated with the search engine configured to identify at least one executable scenario solution provided by an author, the at least one executable scenario solution comprising a series of steps implemented by a work flow that corresponds to the user's search query, to identify at least one suggestion based upon mined data and being relevant to the user's search query, and to generate a user experience that is related to the specific problem that the user wants to solve using
the scenario-related search query,
the at least one identified executable scenario solution, and information mined in association with the scenario-related search query, the at least one identified executable scenario solution, the at least one namespace or keyword associated with the at least one identified executable scenario solution, or a combination thereof;
a transmitting module configured to transmit the identified at least one executable scenario solution and the at least one suggestion based upon mined data for presentation in association with the end-user device; and
a storage module configured to store the transmitted identified at least one executable scenario solution, the at least one namespace or keyword, the at least one suggestion, and at least one enabler that is determined to be required for completing the at least one executable scenario solution for the user-specific problem, the at least one enabler comprising a document, a person, or an organization that implements the at least one executable scenario solution.

10. The computerized system of claim 9, wherein an executable scenario solution comprises a solution that is a series of steps implemented by a workflow and a scenario description that is a webpage that describes the executable scenario solution.

11. The computerized system of claim 9, wherein the receiving module is further configured to receive metadata that corresponds to a user associated with the end user device.

12. The computerized system of claim 9, wherein the data mining module is further configured to mine scenario-related information associated with at least one namespace or keyword to identify scenario solution metadata.

13. The computerized system of claim 12, wherein the data mining module is further configured to mine metadata that corresponds to at least one user group to determine if the user is a member of at least one user group and to identify metadata associated with at least one additional member of the at least one user group and wherein the transmitting module is further configured for transmitting at least one suggestion based upon the metadata associated with the at least one additional member of the at least one user group for presentation in association with the end-user device.

14. The computerized system of claim 10, wherein the executable scenario solution comprises more than one scenario sub-solutions associated with one another.

15. The computerized system of claim 14, wherein the scenario sub-solutions are executed in a particular order.

16. A method of using authored scenario solutions to generate a user-specific experience for a user employing a search engine, the method comprising:
   obtaining one or more executable scenario solutions for a specific problem from at least one author, wherein the one or more executable scenario solutions comprises a series of steps implemented by a workflow;
   tagging the one or more executable scenario solutions in association with at least one namespace or keyword, wherein tags are determined by the at least one author;
   receiving at the search engine a scenario-related search query from a user, the scenario-related search query being related to a user-specific problem and the user being different from the at least one author;
   mining solution related information associated with the at least one namespace or keyword to identify
      A) at least one executable scenario solution for the user-specific problem which, when executed by a user, generates a result associated with the scenario-related search query received from the user,
      B) at least one related executable scenario solution that is related to, but not the same as, the at least one executable scenario solution for the user-specific problem, and
      C) at least one enabler that is determined to be useful for completing at least a portion of the series of steps implemented by a workflow; and
   transmitting items to the user in response to the scenario-related search query, wherein the items include at least one suggestion based upon the at least one executable scenario solution for the user-specific problem and at least one related executable scenario solution based upon the solution related information.

17. The method of claim 16, wherein the operations further comprise
   receiving user information;
   determining if the user is a member of a user group;
   determining if metadata that corresponds to at least one additional user that is also a member of the user group is stored in association with the at least one names pace and keyword; and
   transmitting at least one suggestion based upon the at least one additional-user metadata for presentation if it is determined that metadata associated with the at least one additional user is stored in association with the at least one namespace and keyword.

18. The method of claim 16, wherein the operations further comprise
   receiving user selection of one of the at least one user-executable scenario solution that is relevant to the scenario-related query; and
   storing metadata that corresponds to the user selection in association with the namespace and keyword.

19. The method of claim 16, wherein the at least one executable scenario solution comprises more than one scenario sub-solutions associated with one another.

20. The method of claim 19, wherein the scenario sub-solutions are executed in a particular order.

* * * * *